(12) United States Patent
Rajamani et al.

(10) Patent No.: US 9,258,402 B2
(45) Date of Patent: Feb. 9, 2016

(54) SYSTEM AND METHOD FOR CONTROLLING MOBILE DEVICES

(75) Inventors: Krishnan Rajamani, San Diego, CA (US); Atul Suri, San Diego, CA (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 669 days.

(21) Appl. No.: 12/608,060

(22) Filed: Oct. 29, 2009

(65) Prior Publication Data

US 2010/0259491 A1 Oct. 14, 2010

Related U.S. Application Data

(60) Provisional application No. 61/169,103, filed on Apr. 14, 2009.

(51) Int. Cl.
*H04M 1/725* (2006.01)

(52) U.S. Cl.
CPC ...... *H04M 1/72527* (2013.01); *H04M 2250/22* (2013.01)

(58) Field of Classification Search
CPC ................. H04M 1/72527; H04M 2250/22
See application file for complete search history.

(56) References Cited

U.S. PATENT DOCUMENTS

| 5,920,826 | A | * | 7/1999 | Metso et al. | 455/557 |
| D467,512 | S | * | 12/2002 | Miyazaki | D10/65 |
| 7,663,607 | B2 | * | 2/2010 | Hotelling et al. | 345/173 |
| 2007/0229465 | A1 | * | 10/2007 | Sakai et al. | 345/173 |
| 2007/0293271 | A1 | * | 12/2007 | Streeter | 455/566 |

FOREIGN PATENT DOCUMENTS

| DE | 20005910 U1 | 5/2000 |
| EP | 1307062 | 5/2003 |
| EP | 1871075 | 12/2007 |
| GB | 2369959 | 6/2002 |

(Continued)

OTHER PUBLICATIONS

International Search Report and Written Opinion—PCT/US2010/031028, International Search Authority—Patent Office—Nov. 25, 2010.

(Continued)

*Primary Examiner* — Ilana Spar
*Assistant Examiner* — Mihir Rayan
(74) *Attorney, Agent, or Firm* — Charles E. Eggers

(57) ABSTRACT

Systems and methods displaying information from a mobile device are described herein. One embodiment of this disclosure provides a method of controlling a mobile device without a native touch screen display. The mobile device is coupled to an external touch-screen device. The method comprises receiving input via a touch screen display. The method further comprises mapping the input to one or more keypad events. The method further comprises transmitting to at least one application the one or more keypad events.

18 Claims, 5 Drawing Sheets

(56) References Cited

FOREIGN PATENT DOCUMENTS

| | | |
|---|---|---|
| JP | 2001166867 A | 6/2001 |
| JP | 2003131811 A | 5/2003 |
| JP | 2003244289 | 8/2003 |
| JP | 2003531428 A | 10/2003 |
| JP | 2005173945 A | 6/2005 |
| JP | 2008108184 A | 5/2008 |
| JP | 2009512074 A | 3/2009 |
| WO | 0179980 A1 | 10/2001 |
| WO | 03085960 A1 | 10/2003 |
| WO | 2005114369 A2 | 12/2005 |
| WO | 2007037806 A1 | 4/2007 |
| WO | 2007044900 A2 | 4/2007 |
| WO | WO-2008136064 A1 | 11/2008 |

OTHER PUBLICATIONS

Tyco Electronics: "Touchmonitor User Guide, 1215L 12" LCD Desktop Touchmonitor, 1000 Series 2008, XP007913725 Retrieved from the Internet: URL:http://media.elotouch.com/pdfs/manuals/e378269_b.pdf.

Juniper Network Odyssey Access Client for Windows, User Guide Enterprise Addition, Release 4.7, Oct. 2007, Sunnyvale California, USA.

European Search Report—EP12006022—Search Authority—Munich—Oct. 22, 2012.

Taiwan Search Report—TW099111659—TIPO—Apr. 8, 2013.

\* cited by examiner of the disclosure may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

SYSTEM AND METHOD FOR CONTROLLING MOBILE DEVICES

CROSS REFERENCE TO RELATED APPLICATION(S)

This application claims the benefit of U.S. Provisional Application No. 61/169,103, filed Apr. 14, 2009, the entire content of which is incorporated herein by reference.

BACKGROUND

1. Field

This application relates generally to mobile devices, and more specifically, to cell phones.

2. Background

Mobile devices (e.g., phones, smartphones, Personal Digital Assistants (PDAs), Ultra-Mobile Personal Computers (UMPCs), Mobile Internet Devices (MIDs), etc.) may be connected to external monitors in order to provide a larger and/or secondary display. In such cases, the external monitor may have capabilities that the mobile device does not. Thus, a need exists to utilize the capabilities of the external monitor when connected to the mobile device.

SUMMARY

A summary of sample aspects of the disclosure follows. For convenience, one or more aspects of the disclosure may be referred to herein simply as "some aspects."

Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the features being described provide advantages that include controlling a non-touch screen mobile device using a touch-screen external display.

One embodiment of this disclosure provides a method of controlling a mobile device without a native touch screen display, the mobile device being coupled to an external touch-screen device, the method comprising receiving input via a touch screen display; mapping the input to one or more keypad events; and transmitting to at least one application the one or more keypad events.

Another embodiment of this disclosure provides a method of controlling a mobile device having a plurality of states, the method comprising receiving information indicative of a first state of the mobile device; receiving input via a touch screen; translating the coordinate to a request to transition to a second state of the mobile device based on the first state of the mobile device; and transmitting at least one keypad event, wherein the at least one keypad event causes the mobile device to transition to the second state.

Yet another embodiment of this disclosure provides a system for controlling a mobile device without a native touch screen display, the system comprising a first processing circuit configured to receive an input via a touch screen display; a second processing circuit configured to map the input to one or more keypad events; and a third processing circuit configured to transmit to at least one application the one or more keypad events.

A further embodiment of this disclosure provides a system for controlling a mobile device having a plurality of states, the system comprising a first processing circuit configured to receive information indicative of a first state of the mobile device; a touch screen configured to receive an input; a second processing circuit configured to translate the coordinate to a request to transition to a second state of the mobile device based on the first state of the mobile device; and a third processing circuit configured to transmit at least one keypad event, wherein the at least one keypad event causes the mobile device to transition to the second state.

Yet a further embodiment of this disclosure provides a system for controlling a mobile device without a native touch screen display, the mobile device being coupled to an external touch-screen device, the system comprising means for receiving input via a touch screen display; means for mapping the input to one or more keypad events; and means for transmitting to at least one application the one or more keypad events.

Another embodiment of this disclosure provides a system for controlling a mobile device having a plurality of states, the system comprising means for receiving information indicative of a first state of the mobile device; means for receiving input via a touch screen; means for translating the coordinate to a request to transition to a second state of the mobile device based on the first state of the mobile device; and means for transmitting at least one keypad event, wherein the at least one keypad event causes the mobile device to transition to the second state.

Yet another embodiment of this disclosure provides computer program product, comprising computer-readable medium comprising code for causing a computer to receive input via a touch screen display; code for causing a computer to map the input to one or more keypad events; and code for causing a computer to transmit to at least one application the one or more keypad events.

A further embodiment of this disclosure provides a computer program product, comprising computer-readable medium comprising code for causing a computer to receive information indicative of a first state of the mobile device; code for causing a computer to receive input via a touch screen; code for causing a computer to translate the coordinate to a request to transition to a second state of the mobile device based on the first state of the mobile device; and code for causing a computer to transmit at least one keypad event, wherein the at least one keypad event causes the mobile device to transition to the second state.

DETAILED DESCRIPTION

Figure 1:
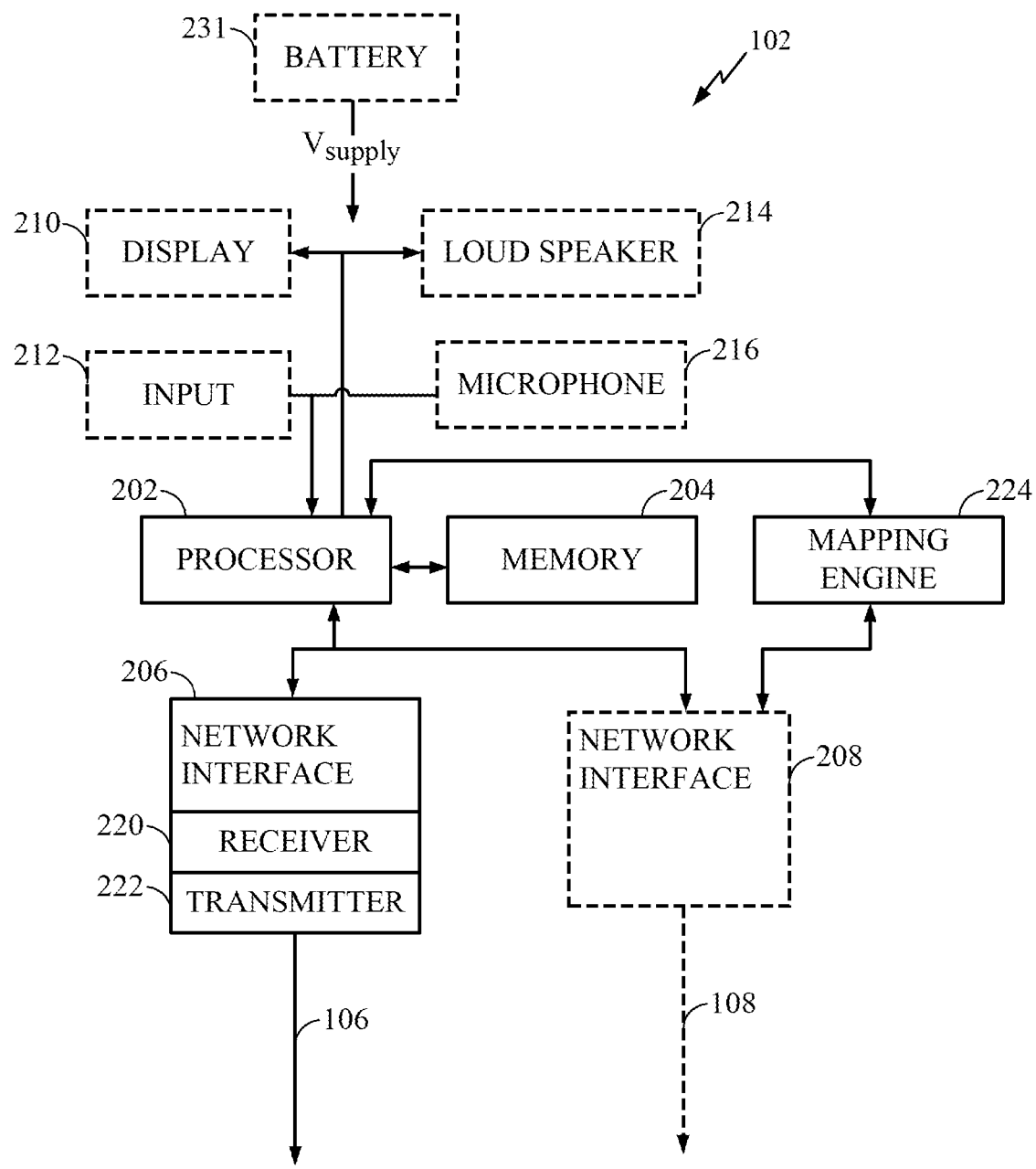
FIG. 1 is a block diagram illustrating an example of a mobile device.

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects connections between mobile devices and displays may be based on wireless protocols. In some aspects, communication channels between devices may be based on a wired data transmission.

Mobile devices typically have small display areas due to size constraints. Mobile devices, however, may be attached to external display devices with larger display areas. The mobile device may then drive the external display device to display information. In some cases, the external display device may support more capabilities than the mobile device. For example, external display device may have a touch-screen capable of receiving tactile input directly through the display, while the mobile device may not have a touch screen. Therefore, methods and devices are described to allow a mobile device to support the additional capabilities of an external display device. Set forth below are some architectures that may be used in conjunction with the described methods and devices.

Personal or body area networks may be defined by devices that have "paired" with each other. Pairing is a process by which devices register with each other, including under user control. Once paired, devices typically can communicate with each other whenever they are within range and active without re-performing the pairing process.

Before pairing, devices must first discover each other, for example, by entering a discoverable state in which devices discover each other through the exchange of discovery messages. Upon discovery, devices may pair with each other. Pairing is at least partly a security function to limit pairing to particular devices. For example, pairing may include an exchange of messages that may include password authentication schemes in which first device must respond with a password (such as a four digit number, which is often fixed at the factory for a device) to a second device to prevent unauthorized or undesired pairing of devices. In networking protocols such as Bluetooth, discovery and pairing are separate procedures. However, they are most often performed together. For some wireless devices, such complexity (e.g., password entry) merely makes device pairing difficult and cumbersome for many users. It has been found that adjusting the pairing process to be based on a pairable state, and optionally, on the temporal and physical co-location of devices, can simplify the process of pairing devices in a personal area network. According to one aspect, a device may enter a pairable state, e.g., based on input from a user control (e.g., by depressing a control button on a device). When such a device receives a discovery and pairing message from another device (which may also be placed in the pairable state by the user), the two devices may pair without further user interaction. Pairing with particular devices can be controlled, for example, based on the pairable state being maintained for a specified period during which time the other device is configured to be pairable or by limiting pairing to devices within a specified distance, or combinations thereof.

FIG. 1 is a block diagram illustrating an example of a mobile device 102. The device 102 includes a processor 202 that is in communication with a memory 204 and a network interface 206 for communicating via the wireless link 106. Optionally, the device 102 may also include one or more of a display 210, a user input device 212 such as a key, touch screen, or other suitable tactile input device, a loudspeaker 214 comprising a transducer adapted to provide audible output based on a signal received over the wireless link 106 and/or a microphone 216 comprising a transducer adapted to provide audible input of a signal that may be transmitted over the wireless link 106. For example, a phone may include the display 210 adapted to provide a visual output of a graphical user interface (GUI).

The network interface 206 may include any suitable antenna (not shown), a receiver 220, and a transmitter 222 so that the exemplary device 102 can communicate with one or more devices over the wireless link 106. Optionally, the network interface 206 may also have processing capabilities to reduce processing requirements of the processor 202.

Optionally, the device 102 may include a second network interface 208 that communicates over a network (e.g., a wide area network such as the Internet) via a link 108. For example, the device 102 may provide connectivity to the network via a wired or wireless communication link. In addition, it should be appreciated that one or more of the devices 102 may be portable or, in some cases, relatively non-portable. The second network interface 208 may transmit and receive RF signals according to the IEEE 802.11 standard, including IEEE 802.11(a), (b), or (g), the BLUETOOTH standard, and/or CDMA, GSM, AMPS or other known signals that are used to communicate within a wireless cell phone network. In addition, the second network interface 208 may comprise any suitable wired network interface such as Ethernet (IEEE 802.3), USB, or MDDI.

The device 102 may include a battery 231 to provide power to one or more components of the device 102. The device 102 may comprise at least one of a phone, smartphone, Personal Digital Assistant (PDA), Ultra-Mobile Personal Computer (UMPC), Mobile Internet Device (MID), or any other mobile device. In particular, the teachings herein may be incorporated into (e.g., implemented within or performed by) a variety of the devices 102.

The device may also include a mapping engine 224. The mapping engine 224 may be in communication with the second network interface 208. The mapping engine 224 may be configured to receive an input via the network interface 208 and map the input to a corresponding command or mapped input understood by the device 102. The mapped input may correspond, for example, to a similar input configured to be received at the user input device 212. For example, user input device 212 may correspond to a keypad. Accordingly, user input device 212 may send input indicative of keys pressed to processor 202 for control of the device 102. The network interface 208 may be in communication with another device comprising a touch-screen interface. Input indicative of one or more regions touched on the touch-screen interface may be received at the network interface 208. The input may be provided to the mapping engine 224, which maps the touch input to a mapped input indicative of one or more key presses. The mapped input may be sent to processor 202 for control of the device 102. The mapping procedure is further described below.

The components described herein may be implemented in a variety of ways. Referring to FIG. 1, the device or apparatus 102 is represented as a series of interrelated functional blocks that may represent functions implemented by, for example the processor 202, software, some combination thereof, or in some other manner as taught herein. For example, the processor 202 may facilitate user input via the input devices 212. Further, the transmitter 222 may comprise a processor for transmitting that provides various functionalities relating to transmitting information to another device 102. The receiver 220 may comprises a processor for receiving that provides various functionality relating to receiving information from another device 102 as taught herein.

As noted above, FIG. 1 illustrates that in some aspects these components may be implemented via appropriate processor components. These processor components may in some aspects be implemented, at least in part, using structure as taught herein. In some aspects, a processor may be adapted to implement a portion or all of the functionality of one or more of these components. In some aspects one or more of the components represented by dashed boxes are optional.

Figure 2:
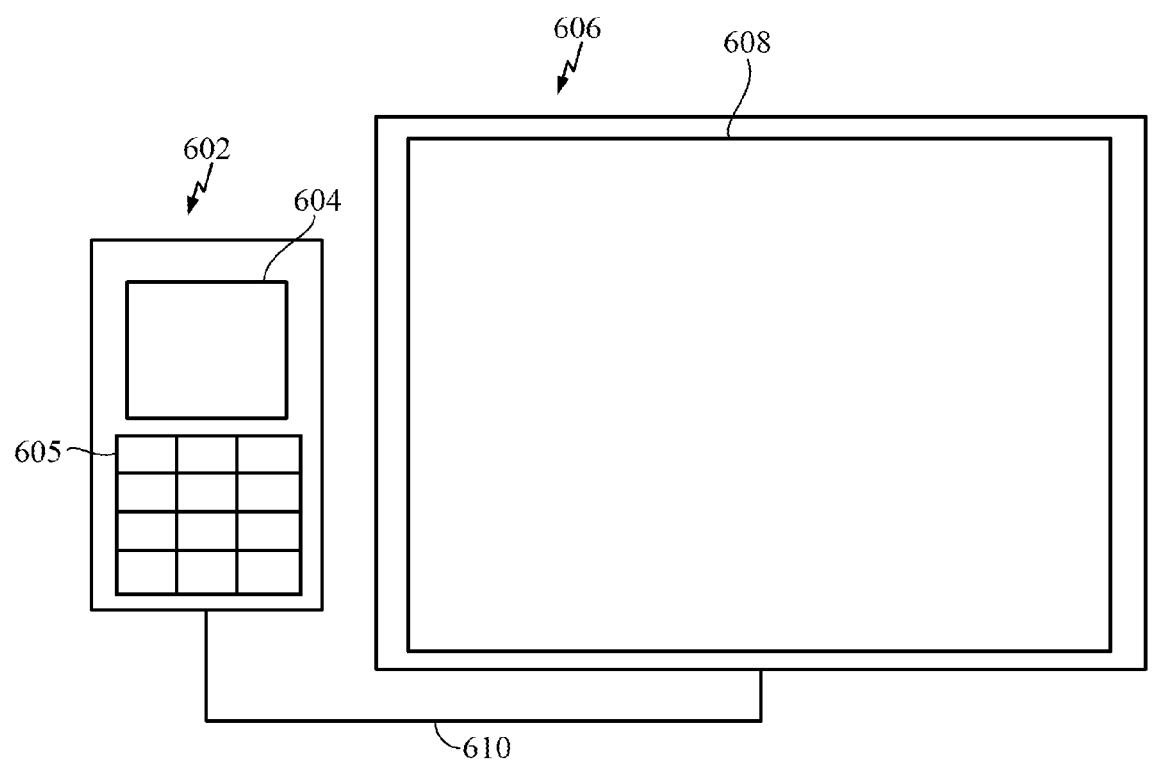
FIG. 2 is a diagram of an embodiment of a mobile device of FIG. 1 connected to an external touch-screen display device.

FIG. 2 is a diagram of a mobile device 602 (e.g., device 102) connected to an external display device 606. Mobile device 602 has a display 604 (e.g., display 210). External display device 606 has a display 608. In some embodiments, the displays 604 and 608 may be interferometric modulating MEMS devices, LCDs, OLEDs, CRTs, DLPs, etc.

Mobile device 602 and external display device 606 may be connected wirelessly or by wire. Mobile device 602 may have a network interface such as second network interface 208 as shown in FIG. 1. External display device 606 may have a similar network interface. Mobile device 602 and external display device 606 may communicate using these network interfaces when connected. Connection 610 (e.g., connection 108) may be a wireless or wired connection between external display device 606 and mobile device 602. In some embodiments, the proximity of the mobile device 602 to the external device 606 causes the devices to automatically pair and form a connection. In some embodiments, the user is queried as to the capabilities of mobile device 602 and/or external device 606 (e.g., touch-screen, non touch-screen).

When mobile device 602 is connected to external display device 606, the display 608 may be driven by mobile device 602 to display the same information as displayed on display 604. In one embodiment, display 604 turns off when mobile device 602 is connected to external display device 606. In another embodiment, display 604 stays on when mobile device 602 is connected to external display device 606.

In some embodiments, mobile device 602 includes a display 604 that is a touch screen and may receive input via the display 604. Mobile device 602 may be configured to display a graphical user interface (GUI) to a user on display 604. The user may then interact with the GUI by touching objects on the display 604. For example, the display 604 may be represented by a 2-dimensional plane with an x and y axis. The mobile device 602 may respond according to the (x,y) coordinate touched on display 604. Further, the mobile device 602 may respond according to gestures (e.g., swiping a finger across the screen, swiping two fingers together on the screen, etc.). The gestures may correspond to one or more sequences of (x,y) coordinates touched on display 604. The mobile device 602 may be configured to respond according to the input received via the display 604. In one embodiment, external display device 606 also includes a display 608 that is a touch screen and may receive input via the display 608. When mobile device 602 is connected to external display device 606, display 608 may be driven by mobile device 602 to display the same GUI as displayed on display 604. External display device 606 may be configured to receive input via display 608. In one embodiment, the input received via display 608 may be used to control mobile device 602. For example, the display 608 may be represented by a 2-dimensional plane with an x and y axis. The mobile device 602 may respond according to the (x,y) coordinate touched on display 608. Further, the external display device 606 may respond according to gestures (e.g., swiping a finger across the screen, swiping two fingers together on the screen, etc.). The gestures may correspond to one or more sequences of (x,y) coordinates touched on display 608. External display device 606 may send information to mobile device 602 over connection 610 corresponding to the (x,y) coordinate touched and/or gestures performed on display 608. In some embodiments, display 608 and display 604 may be of different size. In such embodiments, the values of the (x,y) coordinates touched on display 608 may be scaled (e.g., by the mapping engine 224) appropriately to correspond to the correct values on display 604. For example, mobile device 602 may comprise a mapping engine configured to receive input from the external display device 606 and map them to corresponding mapped input for control of the mobile device 602 as described above with respect to the mapping engine 224 shown in FIG. 1.

In other embodiments, mobile device 602 includes a display 604 that is not a touch screen and may receive input via a keypad 605. Mobile device 602 may be configured to display a graphical user interface (GUI) to a user on display 604. The user may then interact with the GUI by utilizing keypad 605. For example, the user may perform a keypad event such as press an up button on keypad 605 to move a cursor up amongst a list of items on display 604. The user may then press an ok button to select an item. Accordingly, mobile device 602 is configured to receive discrete keypad event commands corresponding to a button press as opposed to input commands from a touch screen such as (x,y) coordinates.

Methods and systems are described below that allow a mobile device 602 that does not include a touch screen to receive and process input from an external touch screen device. In one embodiment, the input received via external display device 606 may be used to control mobile device 602. For example, a user may touch objects of the GUI of the mobile device 602 which is displayed on display 608 of the external display device 608. The touch input may then be translated to the appropriate sequence of keypad events to control mobile device 602. For example, mobile device 602 and/or external display device 606 may comprise a mapping engine configured to receive input from the external display device 606 and map them to corresponding mapped input for control of the mobile device 602 as described above with respect to the mapping engine 224 shown in FIG. 1.

One method of translating the touch input to the appropriate sequence of keypad events is to have software on the mobile device 602 which performs the translation. Another method of translation is to have software on the external display device 606 which performs the translation. Other methods may include a combination of the above methods, where software on mobile device 602 and software on external display device 606 interact to perform the translation.

In one embodiment, a mobile device 602 can be regarded as a "stack" of resources that provide a hardware and operating system software environment in which application software runs. In the simplest version, application software runs on top of an operating system (OS), which runs on the hardware of the mobile device 602. The operating system provides access to the various resources including input/output (IO) features of the hardware, access to permanent or temporary storage organized in a file system, and performs scheduling of tasks or processes to individual CPUs or cores for execution.

In one embodiment, mobile device 602 includes software (e.g., a driver, mapping engine 224, etc.) that allows mobile device 602 to receive input from external display device 606. In one embodiment, the input received is a set of (x,y) coordinates. In another embodiment the input received corresponds to one or more gestures (e.g., swiping a finger across the screen, swiping two fingers together on the screen, etc.). The gestures may correspond to one or more sequences of (x,y) coordinates touched on display 608 of the external display device 606. The input may then be sent to applications running on mobile device 602. In some embodiments, applications are designed to directly accept input in the form of (x,y) coordinates and/or gestures and the operating system of mobile device 602, sends the (x,y) coordinates and/or input indicative of a gesture to the application.

In other embodiments, applications are not designed to accept input in the form of (x,y) coordinates and/or gestures and instead, expect to receive input in the form of keypad events. In some such embodiments, applications are modified to accept input in the form of (x,y) coordinates and/or gestures. In other embodiments the operating system is modified to take input in the form of (x,y) coordinates and/or gestures, and send keypad events to an application. In yet other embodiments, a virtual keypad driver may be running on the operating system of mobile device 602. The virtual keypad driver may be configured to translate (x,y) coordinates and/or gestures to keypad events.

In some embodiments, the mobile device 602 may be thought of as a state machine. For example, the phone may start at an initial state A and display a startup screen accordingly. When a user presses a button on a keypad the phone may move to a second state B. State B for example, may be the phone running a music player application comprising a list of songs, wherein a cursor is placed on a first song on the list. A user may press a down button on the keypad to enter State C, where the phone is running the music player application and the cursor is placed on a second song on the list. The virtual keypad driver may keep track of the different states of mobile device 602 and the keypad events required to transition from one state to another.

In the music player application example, the list of song titles may be displayed on display 608 of external display device 606. The size and position of each song title may be known for the particular application by previously determining how the display is rendered. Therefore, it is known which (x,y) coordinates correspond to a particular song title. Touching a particular (x,y) coordinate of a song title may then correspond to the user requesting that the mobile device 602 transition to a state where the song title is selected. Each state of the mobile device 602 is known (or at least each state for a particular application is known) and the keypad events necessary to transition between any two states is known. Therefore, it is possible to map an (x,y) coordinate corresponding to the touch of a particular song title, to keypad events that transition the mobile device 602 from the state it was in prior to the song title being pressed on display 608, to a state where the song title is selected.

In other embodiments, applications or the operating system may be designed such that (x,y) coordinates directly map to keypad events. For example, an application may be designed such that objects are displayed as a list from 1 to 9 and each object is selected by pressing one of buttons 1-9 on keypad 605. The mobile device 602 may keep track of where the list objects 1 to 9 are rendered on the display 608 and therefore directly map a set of (x,y) coordinates corresponding to the position of a list object to the corresponding keypad event.

In yet another embodiment, applications or the operating system may be designed such that one or more gestures map to one or more keypad events. For an example, an application may be designed such that the display can be zoomed in and zoomed out using particular key presses. A gesture such as pinching two fingers together or spreading them apart on the display 608 may map to the corresponding keypad events for zooming in and zooming out, respectively.

The translation software may be stored on the mobile device, such that the mobile device merely receives (x,y) coordinate inputs and/or input corresponding to gestures from external display device 606. The (x,y) coordinates received may be scaled depending on the size and shape of display 608, such that the received (x,y) coordinates for selection of a song are the same no matter what the size or shape of display 608. The mobile device 602 then translates the input coordinates and/or gestures to keypad events depending on the current state of the mobile device 602 and the desired state of the mobile device 602.

In another embodiment, the translation software may be stored on external display device 606. In such an embodiment, mobile device 602 may send information corresponding to its state information to external display device 606. External display device 606 may then translate the input coordinates and/or gestures to keypad events depending on the state the mobile device 602 is currently in, and then send the keypad events back to mobile device 602.

The following is a table of an exemplary mapping that may be used to map input in the form of (x,y) coordinates and/or gestures to input understood by applications not designed to accept input in the form of (x,y) coordinates and/or gestures. The table is merely for illustrative purposes and the embodiments described herein are not limited to this particular example. The first column represents the region of the screen that receives the input in (x, y) coordinates. For example, (1, 1) corresponds to coordinate (1, 1). Further, (1-6, 1-6) corresponds to any input having an x value between 1 and 6 and a y value between 1 and 6. The second column corresponds to the object maintained by the application or the action to be performed. For example, one object may be the first song in a list. The third column corresponds to the type of input detected (e.g., a single touch, a pinch, a two finger touch, a swipe, etc.). The fourth column corresponds to the output generated for the application (e.g., particular keypad events).

TABLE 1

| Area of Input | Object/Action | Type of Input | Output |
| --- | --- | --- | --- |
| (1-6, 1-6) | Third Song | Single touch | Down, Down, Enter |
| (1-40, 1-40) | Zoom | Pinch | Zoom__Soft__Key |
| (9-12, 9-10) | Play | Single touch | Ok__button |

Figure 3:
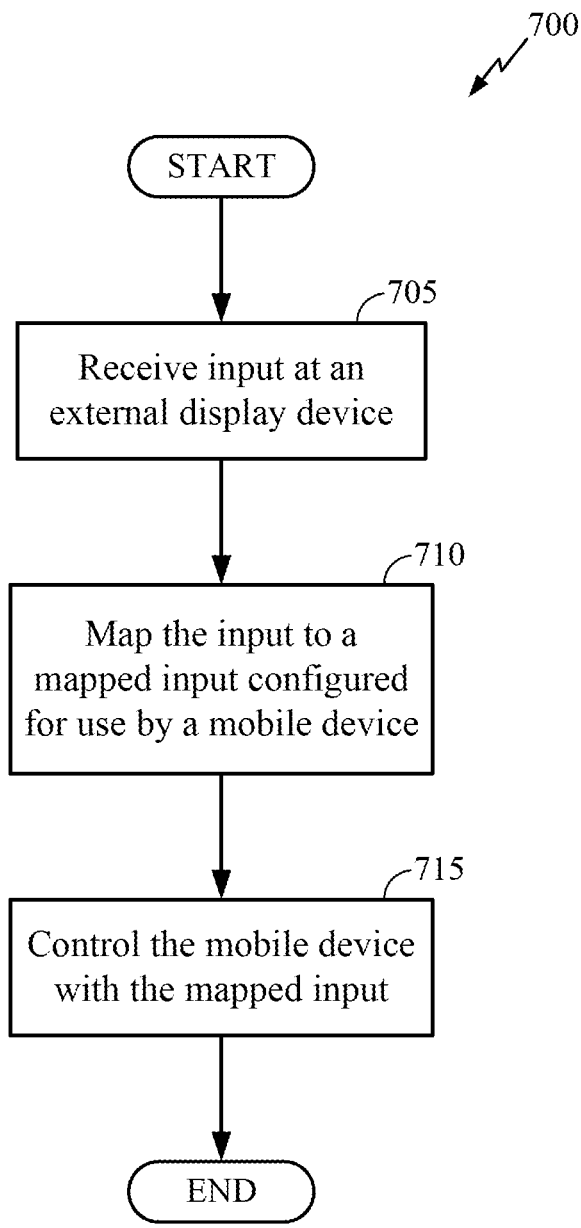
FIG. 3 is a flowchart of a process of using an input received from an external device to control a mobile device shown in FIG. 2.

FIG. 3 is a flowchart of a process of using an input received from an external device to control a mobile device shown in FIG. 2. At a step 705, an input is received at the external display device 606. Further at a step 710, the input is mapped to an input configured for use by the mobile device 602. Continuing at a step 715, the mapped input is used to control the mobile device 602.

Figure 4:
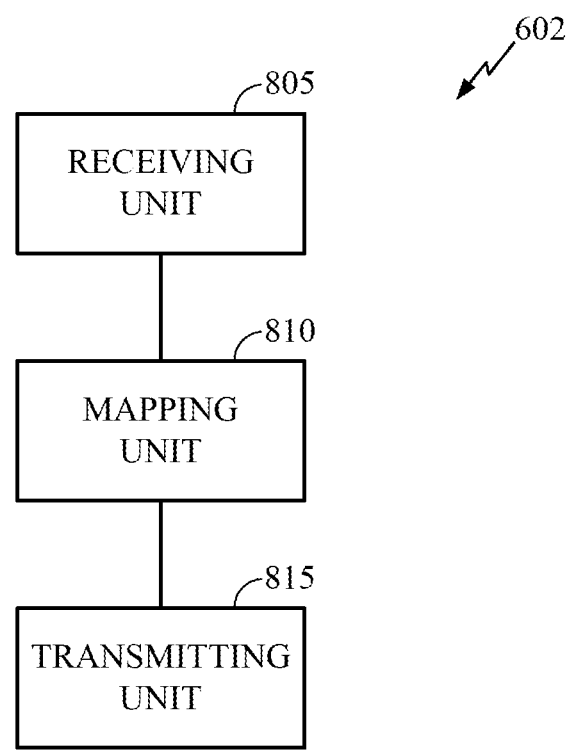
FIG. 4 is a block diagram illustrating another example of a mobile device.
Figure 5:
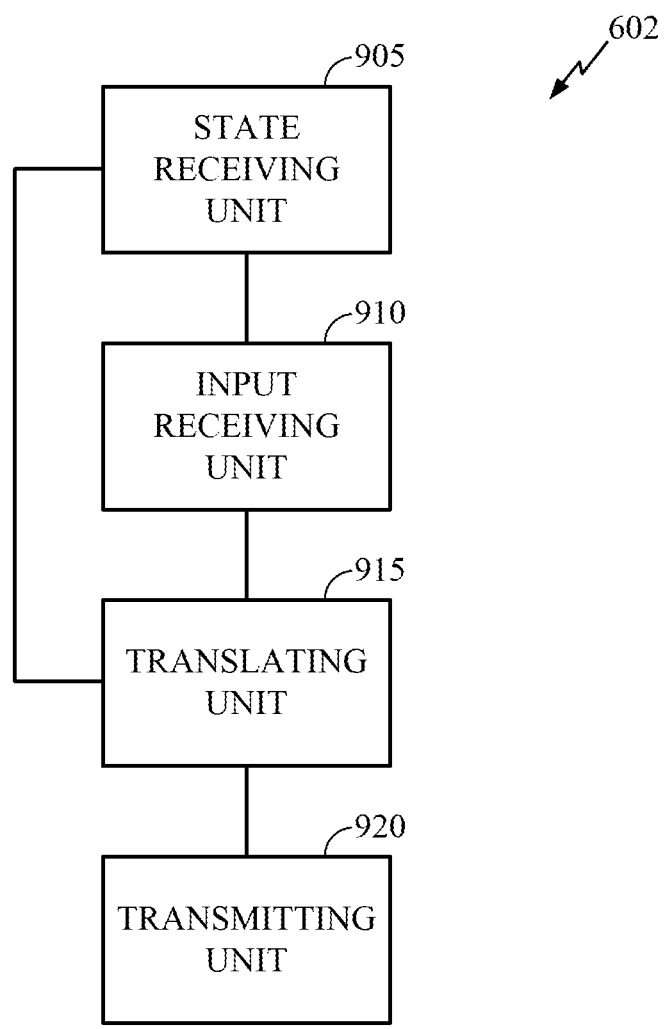
FIG. 5 is a block diagram illustrating yet another example of a mobile device.

The functionality described herein (e.g., with regard to one or more of the accompanying figures) may correspond in some aspects to similarly designated "means for" functionality in the appended claims. Referring to FIGS. 4-5, the mobile device 602 is represented as a series of interrelated functional modules.

FIG. 4 is a block diagram illustrating another example of a mobile device. As shown, the mobile device 602 may comprise a receiving unit 805, a mapping unit 810, and a transmitting unit 815. The receiving unit 805 may correspond at least in some aspects to, for example, a network interface and/or a processor as discussed herein. The mapping unit 810 may correspond at least in some aspects to, for example, a mapping engine and/or a processor as discussed herein. The transmitting unit 815 may correspond at least in some aspects to, for example, a mapping engine and/or a processor as discussed herein.

FIG. 5 is a block diagram illustrating another example of a mobile device. As shown, the mobile device 602 may comprise a state receiving unit 905, a input receiving unit 910, a translating unit 915, and a transmitting unit 920. The state receiving unit 905 may correspond at least in some aspects to, for example, a memory, a mapping engine, and/or a processor as discussed herein. The input receiving unit 910 may correspond at least in some aspects to, for example, a mapping engine, a network interface and/or a processor as discussed herein. The translating unit 915 may correspond at least in some aspects to, for example, a mapping engine and/or a processor as discussed herein. The transmitting unit 920 may correspond at least in some aspects to, for example, a mapping engine and/or a processor as discussed herein.

The functionality of the modules of FIGS. 4-5 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

While the specification describes particular examples of the present invention, those of ordinary skill can devise variations of the present invention without departing from the inventive concept. For example, the teachings herein refer to networks with femto cells and macro cells but are equally applicable to networks with other topologies.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method of controlling a mobile device without a native touch screen display, the mobile device being coupled to an external touch-screen device, the method comprising:
   receiving an input via the external touch-screen device configured to display information that is also displayed on a screen of the mobile device, the input comprising one or more coordinates or gestures;
   mapping, by the mobile device, the input to one or more commands to transmit to at least one application running on the mobile device, the mapping including determining a sequence of one or more keypad events of the mobile device based on the input one or more coordinates or gestures and mapping the sequence of one or more keypad events to the one or more commands; and
   transmitting to the at least one application the one or more commands, wherein the one or more commands correspond to the one or more keypad events as received from a user input device of the mobile device, and wherein the input received via the external touch-screen device is not understood by the at least one application.

2. The method of claim 1, wherein the mapping is performed by an operating system of the mobile device.

3. The method of claim 1, wherein the mapping is performed by a device driver.

4. The method of claim 1, wherein the mobile device is coupled to the external touch-screen device via a wired interface.

5. The method of claim 1, wherein the mobile device is coupled to the external touch-screen device via a wireless interface.

6. A method of controlling a mobile device having a plurality of states, the method comprising:
   receiving information indicative of a first state of the mobile device;
   receiving an input via a touch screen configured to display information that is also displayed on a screen of the mobile device, the input comprising one or more coordinates or gestures;
   translating, by the mobile device, the input to one or more commands to transmit to at least one application running on the mobile device that cause the mobile device to transition to a second state based on the first state of the mobile device, the translating including determining a sequence of one or more keypad events of the mobile device based on the input one or more coordinates or gestures and mapping the sequence of one or more keypad events to the one or more commands; and
   transmitting the one or more commands to the at least one application, wherein the one or more commands correspond to the one or more keypad events as received from a user input device of the mobile device, and wherein the input received via the touch screen is not understood by the at least one application.

7. The method of claim 6, wherein receiving an input comprises receiving an input via a wireless interface.

8. The method of claim 6, wherein receiving an input comprises receiving an input via a wired interface.

9. A system for controlling a mobile device without a native touch screen display, the system comprising:
   a first processing circuit configured to receive an input via a touch screen configured to display information that is also displayed on a screen of the mobile device, the input comprising one or more coordinates or gestures;
   a second processing circuit within the mobile device configured to map the input to one or more commands to transmit to at least one application running on the mobile device, wherein the second processing circuit is further configured to determine a sequence of one or more keypad events of the mobile device based on the input one or more coordinates or gestures and map the sequence of one or more keypad events to the one or more commands; and
   a third processing circuit configured to transmit to the at least one application the one or more commands, wherein the one or more commands correspond to the one or more keypad events as received from a user input device of the mobile device, and wherein the input received via the touch screen is not understood by the at least one application.

10. The system of claim 9, wherein the first processing circuit is further configured to receive the input via a wireless interface.

11. The system of claim 9, wherein the third processing circuit is further configured to receive the input via a wired interface.

12. A system for controlling a mobile device having a plurality of states, the system comprising:
   a first processing circuit configured to receive information indicative of a first state of the mobile device;
   a touch screen configured to display information that is also displayed on a screen of the mobile device and to receive an input, the input comprising one or more coordinates or gestures;
   a second processing circuit within the mobile device configured to translate the input to one or more commands to transmit to at least one application running on the mobile device that cause the mobile device to transition to a second state based on the first state of the mobile device, wherein the second processing circuit is further configured to determine a sequence of one or more keypad events of the mobile device based on the input one or more coordinates or gestures and translating the sequence of one or more keypad events to the one or more commands; and
   a third processing circuit configured to transmit the one or more commands to the at least one application, wherein the one or more commands correspond to the one or more keypad events as received from a user input device of the mobile device, and wherein the input received via the touch screen is not understood by the at least one application.

13. The system of claim 12, wherein the third processing circuit is further configured to transmit the at least one keypad event via a wireless interface.

14. The system of claim 12, wherein the third processing circuit is further configured to transmit the at least one keypad event via a wired interface.

15. A system for controlling a mobile device without a native touch screen display, the mobile device being coupled to an external touch-screen device, the system comprising:
   means for receiving an input via the external touch-screen device configured to display information that is also displayed on a screen of the mobile device, the input comprising one or more coordinates or gestures;

means for mapping, using the mobile device, the input to one or more commands to transmit to at least one application running on the mobile device, the means for mapping configured to determine a sequence of one or more keypad events of the mobile device based on the input one or more coordinates or gestures and mapping the sequence to one or more keypad events to the one or more commands; and means for transmitting to the at least one application the one or more commands, wherein the one or more commands correspond to the one or more keypad events as received from a user input device of the mobile device, and wherein the input received via the external touch-screen device is not understood by the at least one application.

16. A system for controlling a mobile device having a plurality of states, the system comprising:

means for receiving information indicative of a first state of the mobile device;

means for receiving input via a touch screen configured to display information that is also displayed on a screen of the mobile device, the input comprising one or more coordinates or gestures;

means for translating, using the mobile device, the input to one or more commands to transmit to at least one application running on the mobile device that cause the mobile device to transition to a second state based on the first state of the mobile device, the means for translating configured to determine a sequence of one or more keypad events of the mobile device based on the input one or more coordinates or gestures and mapping the sequence of one or more keypad events to the one or more commands; and means for transmitting the one or more commands to the at least one application, wherein the one or more commands correspond to the one or more keypad events as received from a user input device of the mobile device, and wherein the input received via the touch screen is not understood by the at least one application.

17. A non-transitory computer program product for controlling a mobile device without a native touch screen display, the mobile device being coupled to an external touch-screen device, comprising:

a computer-readable medium within the mobile device comprising:

code for causing a computer to receive input via the external touch-screen device configured to display information that is also displayed on a screen of the mobile device, the input comprising one or more coordinates or gestures;

code for causing a computer to map the input to one or more commands to transmit to at least one application running on the mobile device, the code for causing a computer to map configured to determine a sequence of one or more keypad events of the mobile device based on the input one or more coordinates or gestures and mapping the sequence of one or more keypad events to the one or more commands; and code for causing a computer to transmit to the at least one application the one or more commands, wherein the one or more commands correspond to the one or more keypad events as received from a user input device of the mobile device, and wherein the input received via the external touch-screen device is not understood by the at least one application.

18. A non-transitory computer program product, comprising:

computer-readable medium within a mobile device comprising:

code for causing a computer to receive information indicative of a first state of the mobile device;

code for causing a computer to receive input via a touch screen configured to display information that is also displayed on a screen of the mobile device, the input corresponding to one or more coordinates or gestures;

code for causing a computer to translate the input to one or more commands to transmit to at least one application running on the mobile device that cause the mobile device to transition to a second state based on the first state of the mobile device, wherein the code for causing a computer to translate is configured to determine a sequence of one or more keypad events of the mobile device based on the input one or more coordinates or gestures and mapping the sequence of one or more keypad events to the one or more commands; and code for causing a computer to transmit the one or more commands to the at least one application, wherein the one or more commands correspond to the one or more keypad events as received from a user input device of the mobile device, and wherein the input received via the touch screen is not understood by the at least one application.

* * * * *